United States Patent
Shin et al.

(10) Patent No.: US 9,014,707 B2
(45) Date of Patent: Apr. 21, 2015

(54) APPARATUS AND METHOD FOR HIERARCHICAL RATE SPLITTING IN HIERARCHICAL CELL COMMUNICATION SYSTEM

(75) Inventors: Won Jae Shin, Yongin-si (KR); Wan Choi, Daejeon (KR); Hyun Ho Choi, Suwon-si (KR); Myung Gil Kang, Daejeon (KR); Chang Yong Shin, Seoul (KR); Won Jong Noh, Yongin-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 194 days.

(21) Appl. No.: 13/297,943

(22) Filed: Nov. 16, 2011

(65) Prior Publication Data
US 2012/0214497 A1    Aug. 23, 2012

(30) Foreign Application Priority Data

Feb. 22, 2011    (KR) ........................ 10-2011-0015614

(51) Int. Cl.
 *H04W 40/00* (2009.01)
 *H04W 16/32* (2009.01)
(52) U.S. Cl.
 CPC .................................... *H04W 16/32* (2013.01)

(58) Field of Classification Search
 USPC .............. 455/449, 444, 448, 456.4, 572, 574, 455/550.1; 370/229, 311, 254, 279
 See application file for complete search history.

(56) References Cited

U.S. PATENT DOCUMENTS

| | | | |
|---|---|---|---|
| 8,543,118 B1 * | 9/2013 | Mangal et al. | 455/444 |
| 2008/0075029 A1 * | 3/2008 | Song | 370/311 |
| 2009/0097443 A1 * | 4/2009 | Pasanen et al. | 370/329 |
| 2009/0135737 A1 * | 5/2009 | Vikberg et al. | 370/254 |
| 2009/0252088 A1 * | 10/2009 | Rao et al. | 370/328 |
| 2009/0285133 A1 * | 11/2009 | Rao et al. | 370/279 |
| 2010/0054196 A1 | 3/2010 | Hui | |
| 2011/0059765 A1 * | 3/2011 | Kim et al. | 455/550.1 |

FOREIGN PATENT DOCUMENTS

| | | |
|---|---|---|
| EP | 2 180 739 | 4/2010 |
| JP | 2009-225039 | 10/2009 |
| JP | 2009-253569 | 10/2009 |
| KR | 10-2010-0038558 | 4/2010 |
| KR | 10-2010-0109616 | 10/2010 |
| KR | 10-2010-0116763 | 11/2010 |

* cited by examiner

*Primary Examiner* — Mahendra Patel
(74) *Attorney, Agent, or Firm* — NSIP Law

(57) ABSTRACT

Provided is a hierarchical rate splitting method and apparatus in a hierarchical cell communication system. An upper node or a macro base station may adaptively determine a hierarchical splitting mode based on a channel condition of a channel between the macro base station and a macro terminal and/or a performance of pico terminals in comparison to a performance of the macro terminal.

26 Claims, 12 Drawing Sheets

APPARATUS AND METHOD FOR HIERARCHICAL RATE SPLITTING IN HIERARCHICAL CELL COMMUNICATION SYSTEM

CROSS-REFERENCE TO RELATED APPLICATION(S)

This application claims the benefit under 35 U.S.C. §119 (a) of Korean Patent Application No. 10-2011-0015614, filed on Feb. 22, 2011, in the Korean Intellectual Property Office, the entire disclosure of which is incorporated herein by reference for all purposes.

BACKGROUND

1. Field

The following description relates to a hierarchical rate splitting method and apparatus for a hierarchical cell communication system.

2. Description of Related Art

Recently, various wireless communication technologies and devices have been developed. As a result, the demand for wireless communication has rapidly increased. This demand has caused a lack of frequency resources resulting in a demand for more effective use of the frequency resources.

A hierarchical cell environment is an environment in which a macro cell includes small cells that are formed by small base stations, and that make up a self organizing network. The small cells formed by the small base stations may include, for example, a relay cell, a femto cell, a pico cell, a cell based on a home node-B (HNB), a cell based on a node-B (HeNB), a cell based on a remote radio head (RRH), and the like.

While the hierarchical cell environment may increase a total system capacity, a quality of a service of a user may deteriorate because of interference between a macro base station and a small base station. Therefore, interference between the macro cell and the small cells needs to be more effectively managed.

SUMMARY

In one general aspect, there is provided a communication method of a macro base station in a hierarchical cell communication system including the macro base station that serves a macro terminal, a first pico base station that serves a first pico terminal, a second pico base station that serves a second pico terminal, the method including determining a hierarchical rate splitting mode in a predetermined frequency band, based on a channel condition value of a channel between the macro base station and the macro terminal, wherein the hierarchical rate splitting mode identifies a type of a rate splitting message that is generated by each of the macro base station, the first pico base station, and the second pico base station, for rate splitting of the first pico base station and the second pico base station, and determining a transmission power with respect to the predetermined frequency band, based on the hierarchical rate splitting mode.

The communication method may further include transmitting, to the first pico base station and the second pico base station, information that is associated with the determined hierarchical rate splitting mode.

The determining of the hierarchical rate splitting mode may include determining a candidate mode as the hierarchical rate splitting mode, and the candidate mode may include at least one of a first mode in which the macro base station generates a common message for the first pico terminal and a common message for the second pico terminal, the first pico base station generates a private message for the first pico terminal, and the second pico base station generates a private message for the second pico terminal, a second mode in which the macro base station is silenced, the first pico base station generates a common message and the private message for the first pico terminal, and the second pico base station generates a common message and the private message for the second pico terminal, and a third mode in which the macro base station generates the common message for the first pico terminal, the common message for the second pico terminal, and a message for the macro terminal, the first pico base station generates the common message and the private message for the first pico terminal, and the second pico base station generates the common message and the private message for the second pico terminal.

In response to the channel condition value of the channel between the macro base station and the macro terminal being less than a predetermined threshold, and in response to a ratio of an interference to noise ratio (INR) to a signal to noise ratio (SNR) for each of the first pico terminal and the second pico terminal being less than a predetermined value, the determining of the hierarchical rate splitting mode may include determining the hierarchical rate splitting mode, to enable the macro base station to generate a common message for the first pico terminal and a common message for the second pico terminal, to enable the first pico base station to generate a private message for the first pico terminal, and to enable the second pico base station to generate a private message for the second pico terminal.

The determining of the transmission power may include determining the transmission power with respect to the predetermined frequency band, based on an SNR of the first pico terminal with respect to the first pico base station, an SNR of the first pico terminal with respect to the macro base station, and an INR of the first pico terminal with respect to the second pico terminal, and based on an SNR of the second pico terminal with respect to the second base station, an SNR of the second pico terminal with respect to the macro base station, and an INR of the second pico terminal with respect to the first pico terminal.

In response to the channel condition value of the channel between the macro base station and the macro terminal being less than a predetermined threshold, and in response to a ratio of an INR to an SNR for each of the first pico terminal and the second pico terminal being greater than or equal to a predetermined value, the determining of the hierarchical rate splitting mode may include determining the hierarchical rate splitting mode to enable the macro base station to be silenced, to enable the first pico base station to generate a common message and a private message for the first pico terminal, and to enable the second pico base station to generate a common message and a private message for the second pico terminal.

The determining of the transmission power with respect to the predetermined frequency band may include determining the transmission power with respect to the predetermined frequency band, based on an SNR of the first pico terminal with respect to the first pico base station and an INR of the first pico terminal with respect to the second pico terminal, and based on an SNR of the second pico terminal with respect to the second pico base station, an INR of the second pico terminal with respect to the first pico terminal.

In response to the channel condition value of the channel between the macro base station and the macro terminal being greater than or equal to a predetermined threshold, the determining of the hierarchical rate splitting mode may include determining the hierarchical rate splitting mode to enable the macro base station to generate a common message for the first pico terminal, a common message for the second pico terminal, and a private message for the macro terminal, and to enable the first pico base station to generate a common message and a private message for the first pico terminal, and to enable the second pico base station to generate a common message and a private message for the second pico terminal.

The communication method may further include performing a dirty paper coding (DPC) to prevent the common message of the macro base station for the first pico terminal and the common message of the macro base station for the second pico terminal from acting as interference in the macro terminal, in response to the channel condition value of the channel between the macro base station and the macro terminal being greater than or equal to a predetermined threshold.

The communication method may further include performing encoding using a rate splitting scheme, based on the hierarchical rate splitting mode and the transmission power.

In another aspect, there is provided a communication method of an upper node in a hierarchical cell communication system, the upper node having lower nodes including a macro base station that serves a macro terminal, a first pico base station that serves a first terminal, a second pico base station that serves a second pico terminal, the method including determining a hierarchical rate splitting mode in a predetermined frequency band, based on a channel condition value of a channel between the macro base station and the macro terminal, wherein the hierarchical rate splitting mode identifies a type of a rate splitting message that is generated by each of the macro base station, the first pico base station, and the second pico base station, for rate splitting of the first pico base station and the second pico base station, and determining a transmission power for each of the macro base station, the first pico base station and the second pico base station, with respect to the predetermined frequency band, based on the hierarchical rate splitting mode.

The communication method may further include transmitting information that is associated with the determined hierarchical rate splitting mode to the macro base station, the first pico base station, and the second base station.

In response to the channel condition value of the channel between the macro base station and the macro terminal being less than a predetermined threshold, and in response to a ratio of an interference to noise ratio (INR) to a signal to noise ratio (SNR) for each of the first pico terminal and the second pico terminal being less than a predetermined value, the determining of the hierarchical rate splitting mode may include determining the hierarchical rate splitting mode, to enable the macro base station to generate a common message for the first pico terminal and a common message for the second pico terminal, to enable the first pico base station to generate a private message for the first pico terminal, and to enable the second pico base station to generate a private message for the second pico terminal.

In response to the channel condition value of the channel between the macro base station and the macro terminal being less than a predetermined threshold, and in response to a ratio of an INR to an SNR for each of the first pico terminal and the second pico terminal being greater than or equal to a predetermined value, the determining of the hierarchical rate splitting mode may include determining the hierarchical rate splitting mode to enable the macro base station to perform silencing, to enable the first pico base station to generate a common message and a private message for the first pico terminal, and to enable the second pico base station to generate a common message and a private message for the second pico terminal.

In response to the channel condition value of the channel between the macro base station and the macro terminal being greater than or equal to a predetermined threshold, the determining of the hierarchical rate splitting mode may include determining the hierarchical rate splitting mode to enable the macro base station to generate a common message for the first pico terminal, a common message for the second pico terminal, and a private message for the macro terminal, and to enable the first pico base station to generate a common message and a private message for the first pico terminal, and to enable the second pico base station to generate a common message and a private message for the second pico terminal.

In another aspect, there is provided a communication method of a macro base station in a hierarchical cell communication system that includes the macro base station that serves a macro terminal, a first pico base station that serves a first pico terminal, and a second pico base station that serves a second pico terminal, the method including determining a hierarchical rate splitting mode in a frequency band in which transmission of a message for the macro terminal is not performed, based on a signal to noise ratio (SNR) and an interference to noise ratio (INR) for each of the first pico terminal and the second pico terminal, wherein the hierarchical rate splitting mode identifies a type of a rate splitting message of the macro base station for cooperating rate splitting of the first pico base station and the second pico base station, and determining a transmission power with respect to the predetermined frequency band based on the hierarchical rate splitting mode.

In response to a ratio of the INR to the SNR for each of the first pico terminal and the second pico terminal being less than a predetermined value, the determining of the hierarchical rate splitting mode may include determining the hierarchical rate splitting mode to enable the macro base station to generate a common message for the first pico terminal and a common message for the second pico terminal.

The communication method may further include transmitting, to the first pico base station and the second pico base station, information that is associated with the hierarchical rate splitting mode, to enable the first pico base station to generate a private message for the first pico terminal and to enable the second pico base station to generate a private message for the second pico terminal, in response to a ratio of the INR to the SNR for each of the first pico terminal and the second pico terminal being less than a predetermined value.

In response to a ratio of the INR to the SNR for each of the first pico terminal and the second pico terminal being greater than or equal to a predetermined value, the determining of the hierarchical rate splitting mode may include determining the hierarchical rate splitting mode to enable the macro base station to be silenced in the frequency band in which transmission of the message for the macro terminal is not performed.

The communication method may further include transmitting, to the first pico base station and the second pico base station, information that is associated with the hierarchical rate splitting mode, to enable the first pico base station to generate a common message and a private message for the first pico terminal, and to enable the second pico base station to generate a common message and a private message for the second pico terminal when a ratio of the INR to the SNR for each of the first pico terminal and the second pico terminal is greater than or equal to a predetermined value.

In another aspect, there is provided a macro base station for removing interference in a hierarchical communication system, the macro base station including a controller configured to determine a hierarchical rate splitting mode for a pico base station included in the hierarchical communication system, based on a channel condition between the macro base station and a macro terminal that is served by the macro base station, and a transmitter configured to transmit the determined hierarchical rate splitting mode to the pico base station.

The hierarchical rate splitting mode may comprise a first hierarchical rate splitting mode in which the macro base station performs rate splitting to support a pico terminal corresponding to the pico base station, using a frequency band that the macro base station does not use to support the macro terminal, and a second hierarchical rate splitting mode in which the macro base station simultaneously supports the pico terminal corresponding to the pico base station and the macro terminal, using the same frequency band.

The first hierarchical rate splitting mode may comprise a vertical rate splitting scheme in which the pico base station transmits private messages to the pico terminal and the macro base station transmits common messages to the pico terminal, and a horizontal rate splitting scheme in which the macro base station is silent, and the pico base station transmits private messages and common messages to the pico base station, wherein private messages are only capable of being decoded by pico terminals served by the pico base station, and the common messages are capable of being decoded by other pico terminals served by another pico base station.

The controller may determine to use the vertical rate splitting scheme or the horizontal rate splitting scheme based on an interference to noise ratio (INR) and a signal to noise ratio (SNR) of the pico terminal.

The base station may further comprise a receiver configured to receive information about interference affecting the pico terminal.

Other features and aspects may be apparent from the following detailed description, the drawings, and the claims.

Figure 1:
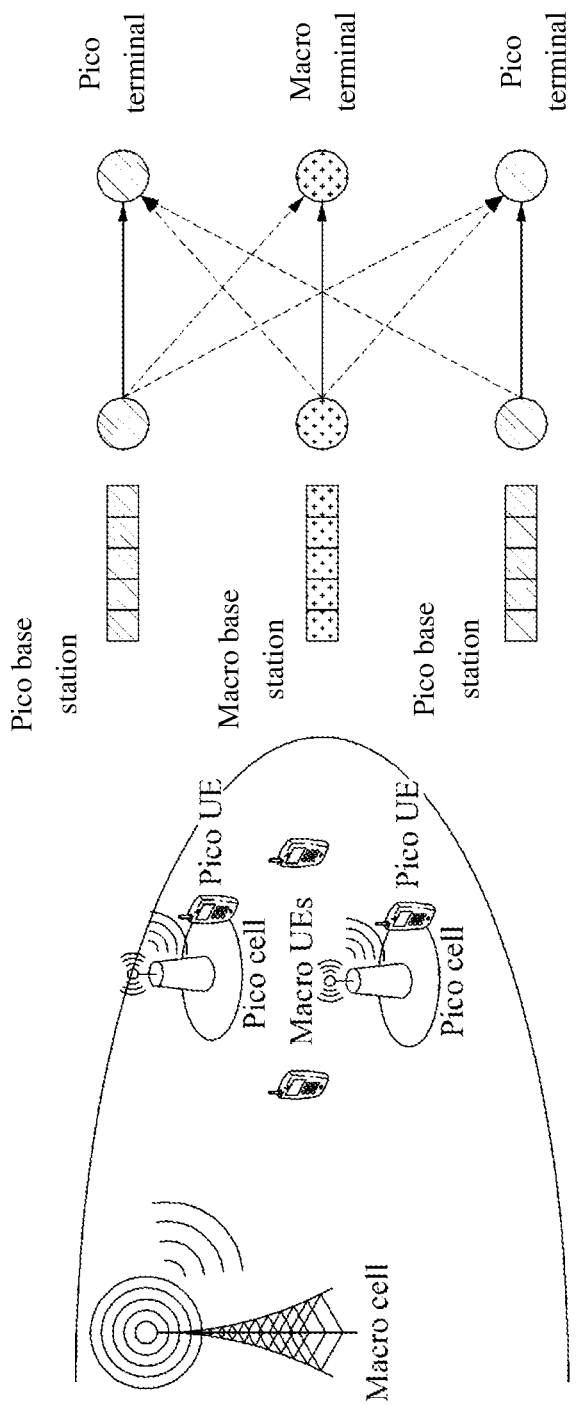
FIG. 1 is a diagram illustrating an example of interference channel modeling in a hierarchical cell communication system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. Also, descriptions of well-known functions and constructions may be omitted for increased clarity and conciseness.

FIG. 1 illustrates an example of interference channel modeling in a hierarchical cell communication system.

Next generation mobile communication system standards such as IEEE 802.16x, 3GPP LTE-Advanced, may add a small cell to a conventional network to improve a transmission speed, for example, the transmission speed of an average user and a transmission speed of a user located on an edge of a small cell. As an example, the small cell may be one or more of a relay cell, a femto cell, a pico cell, a cell based on a home node-B (HNB), a cell based on a node-B (HeNB), a cell based on a remote radio head (RRH), and the like If a small cell is installed in a homogeneous network that includes a macro cell, a user that is located between the macrocell and the small cell may have a low transmission speed because of inter-cell interference. Therefore, there is a desire to overcome inter-cell interference between a macrocell and a picocell in a heterogeneous network environment such as the environment shown in FIG. 1 which illustrates an example of a hierarchical cell communication system in which a macrocell and a picocell coexist.

Even though the examples described herein are applicable to various small cells, such as a picocell, a femtocell, and the like, for ease of description the examples herein are described based on the picocell.

Figure 2:
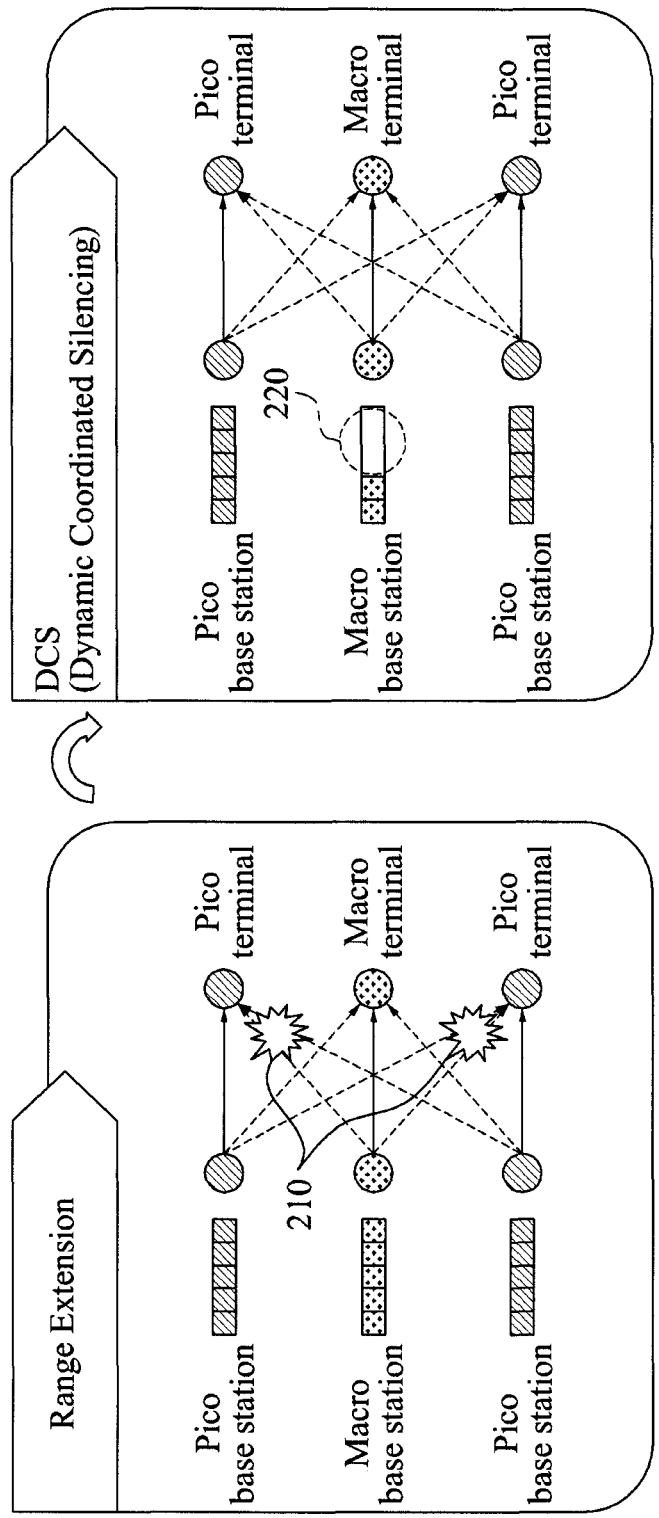
FIG. 2 is a diagram illustrating examples of an interference removing scheme in a hierarchical cell communication system.

FIG. 2 illustrates examples of an interference removing scheme in a hierarchical cell communication system.

Referring to FIG. 2, a range extension scheme and a dynamic coordinated silencing (DCS) scheme are illustrated as examples of the interference removing scheme in the hierarchical cell communication system.

The range extension scheme may not use a conventional cell selection standard that selects a cell based on a received signal strength indicator (RSSI). The range selection scheme may assign a relatively high priority to a picocell during a serving cell selection process so that a greater number of users may use a plurality of frequency resources of the picocell. Accordingly, a cell coverage of the picocell may be extended. In this example, interference from the picocell that affects a macro user may be naturally removed. However, interference 210 from the macrocell that affects the picocell still exists.

In the DCS scheme, for a plurality of pico users, the macro base station does not use partial resources that are used by a plurality of pico users. For example, referring to FIG. 2, a currently used frequency is expressed by an oblique line pattern and a dot pattern. In the example of FIG. 2, five frequency bands exist. The oblique line pattern indicates a frequency that is used for the pico user, and the dot pattern indicates a frequency that is used for the macro user.

A frequency band 220 which is empty indicates a frequency band that the macro base station does not use through coordinated silencing. As described in the forgoing, even though the DCS scheme may improve a performance of an average layer cell user, a performance of the macro user may be deteriorated. The DCS scheme may avoid interference by lowering a frequency reuse factor to be less than 1.

Examples herein provide a method that maintains a frequency reuse factor of 1 and controls interference through rate splitting. This scheme overcomes the drawback of the DCS scheme that has the frequency reuse factor that is less than 1.

For example, a rate splitting scheme may divide a message into a common message and a private message based on a magnitude of a signal and a magnitude of interference, and may transmit the common message and the private message. The common message may be decoded by both a target terminal and a neighboring terminal. The private message may be decodable by the target terminal and may not be decoded by the neighboring terminal, and thus, may act as interference in the neighboring terminal. Therefore, the rate splitting scheme may detect a message by optimally removing interference messages, and thus, a signal-to interference ratio (SINR) may increase and a higher transmission rate may be obtained.

Figure 3:
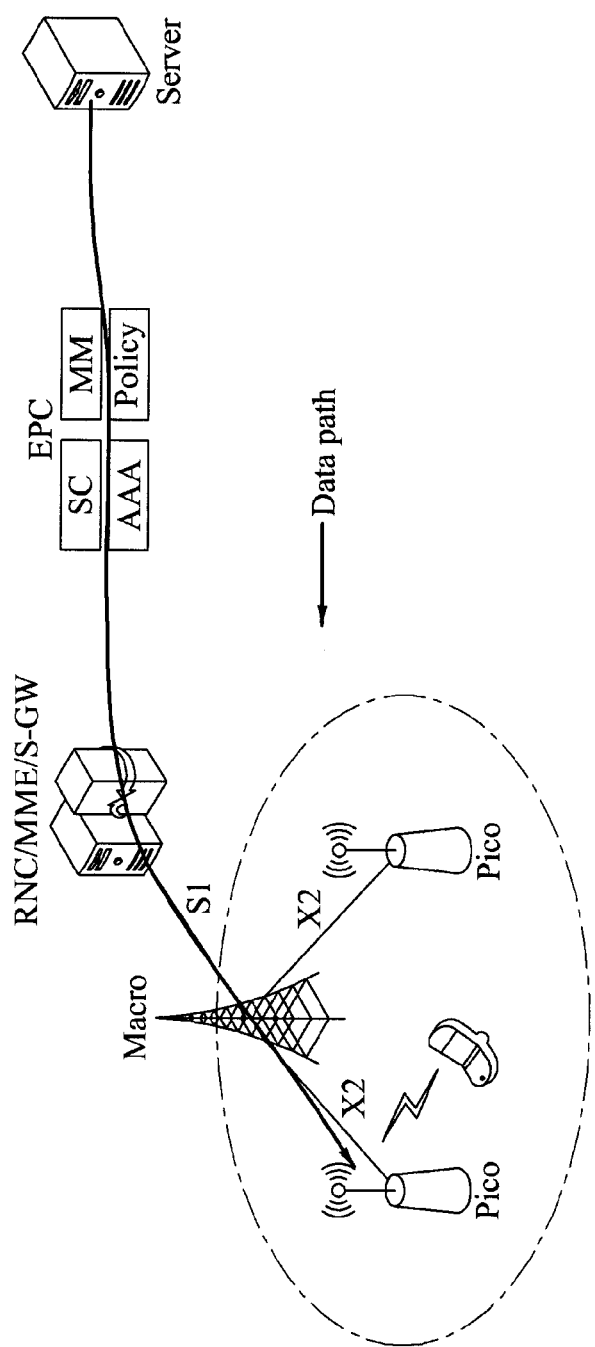
FIG. 3 is a diagram illustrating an example of an evolved universal terrestrial radio access (E-UTRA) network.

FIG. 3 illustrates an example of an evolved universal terrestrial radio access network (E-UTRA) network.

In a hierarchical cell communication system according to various examples, data of a pico base station may be transferred via a macro base station, as shown in the E-UTRA network of FIG. 3. The macro base station may capture data of a pico base station to improve performance. For example, macro base stations may exchange data with each other using an X2 interface in the E-UTRA network of FIG. 3, and thus, backhaul overhead that occurs in joint processing (JP) to manage interference, may be prevented.

In the hierarchical cell communication system, the pico base station and the macro base station may have different features, for example, the macrocell may include and utilize picocell data whereas the picocell may not include the macrocell data. Accordingly, the example of the rate splitting scheme may be referred to as a hierarchical rate splitting method to distinguish the rate splitting scheme from rate splitting performed in a two-user interference channel.

The receivers such as terminals may decode common messages to remove common messages of neighboring terminals, and each receiver may decode a corresponding private message. If a plurality of common messages exist, a decoding sequence of the common messages may be determined in advance.

Hierarchical Rate Splitting Method (Method 1—First Mode and Second Mode)

According to the first hierarchical rate splitting method, the macro base station performs rate splitting to assist the pico users such as the terminals, by utilizing picocell data that the macro base station is aware of, in a frequency band that the macro base station does not use in the DCS scheme. In this example, a frequency reuse factor may be 1 unlike the DCS scheme. Accordingly, performance may be improved without additional overhead.

Figure 4:
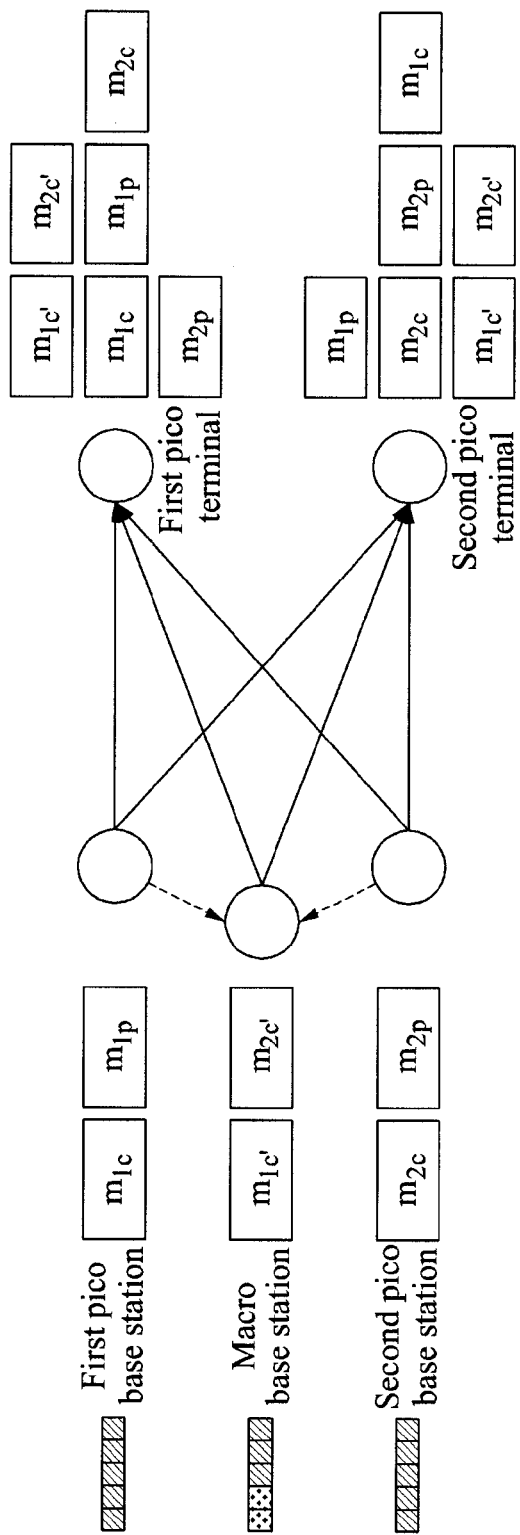
FIG. 4 is a diagram illustrating an example of a hierarchical rate splitting method.

FIG. 4 illustrates an example of a hierarchical rate splitting method.

Referring to FIG. 4, a macro base station maintains a band that the macro terminal uses in the DCS scheme, and uses a frequency band in which silencing is performed in the DCS scheme, for pico terminals. Accordingly, a frequency reuse factor may become 1.

Referring to FIG. 4, in the term $m_{x,y}$, x denotes an index of a terminal, for example, 1 for a first pico terminal and 2 for a second pico terminal, and y denotes a type of a message, for example, c for a common message and p for a private message.

A first pico base station and a second pico base station perform rate splitting. In this example, the first pico base station generates a common message ($m_{1c}$) and a private message ($m_{1p}$) for the first pico terminal, and the second pico base station generates a common message ($m_a$) and a private message ($m_{2p}$) for the second pico terminal. The macro base station generates a common message ($m_{1c}'$) for the first pico terminal and a common message ($m_{2c}'$) for the second pico terminal.

In this example, $m_{1c'}$ is a message for the first pico terminal and is generated based on data that is associated with the first pico base station and that is included in the macro base station. In this example, $m_{1c}'$ may be decoded by the first pico terminal and the second pico terminal. Accordingly, the first pico terminal may improve performance in reception by receiving $m_{1c'}$. The second pico terminal may remove $m_{1c'}$ and thus, performance may not be deteriorated due to $m_{1c''}$.

In the condition illustrated in FIG. 4, even though the hierarchical rate splitting method may be performed in various schemes, two sub-optimal solutions are provided. Also, a method of selecting one from two sub-optimal solutions shows an almost equivalent performance to a performance of an optimal solution.

Figure 5:
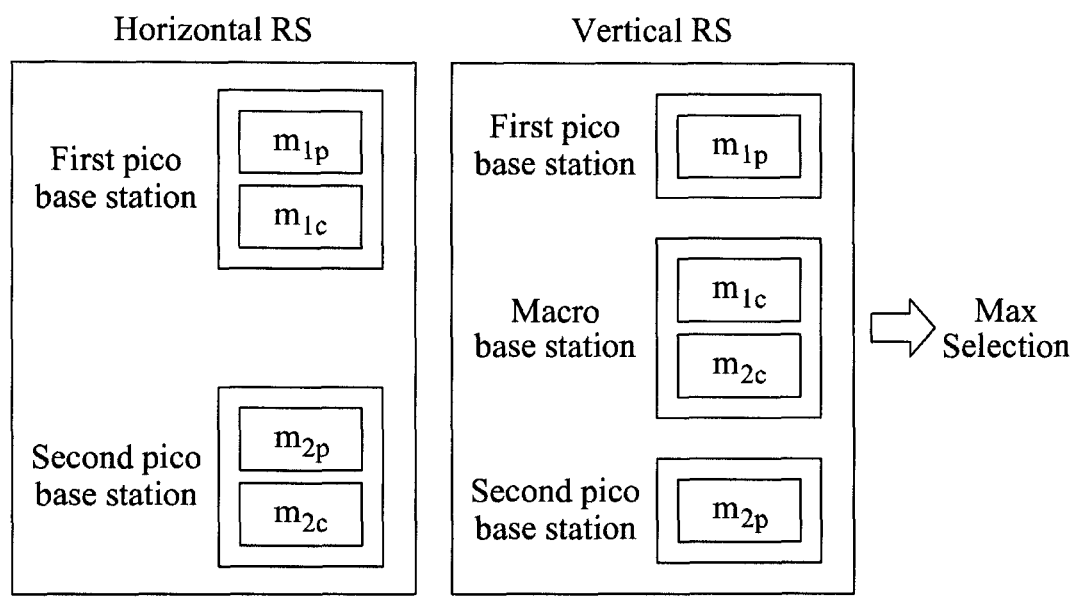
FIG. 5 is a diagram illustrating an example of a vertical rate splitting scheme and a horizontal rate splitting scheme.

FIG. 5 illustrates an example of a vertical rate splitting scheme and a horizontal rate splitting scheme.

Referring to FIG. 5, one sub-optimal solution is a vertical rate splitting scheme in which pico base stations, such as a first pico base station and a second pico base station, transmit private messages and a macro base station transmits common messages for the pico terminals. For example, the vertical rate splitting scheme may include a scheme in which the pico base stations transmit the common messages and the macro base station transmits private messages. A mode that uses the vertical rate splitting scheme is referred to as a first mode.

The other sub-optimal solution is a horizontal rate splitting scheme that is a rate splitting scheme in a 2-user interference channel. In this example, the macro base station performs silencing in a corresponding frequency band. A mode that uses the horizontal rate splitting scheme is referred to as a second mode.

(1) A value of an optimal power allocation in the vertical rate splitting scheme, that is, in the first mode, is calculated. An algorithm for the optimal power allocation is as follows.

An achievable rate (R) of the vertical rate splitting scheme is expressed by Equation 1. In this example, it is assumed that a first pico cell and a second pico cell are symmetric.

$$R = \log\left(1 + \frac{k_1 SNR}{1 + k_1 INR}\right) + \min\left\{\frac{1}{2}\log\left(1 + \frac{2(1-k_1)SNR_M}{1 + k_1(SNR + INR)}\right), \log\left(1 - \frac{(1-k_1)SNR_M}{1 + k_1(SNR + INR)}\right)\right\} \quad \text{[Equation 1]}$$

In Equation 1, SNR denotes a signal-to-noise ratio of a first pico terminal with respect to the first pico base station, and $SNR_M$ denotes a signal-to-noise ratio of the first pico terminal with respect to the macro base station. In Equation 1, INR denotes an interference-to-noise ratio of the first pico terminal with respect to the second pico base station. Because the system is symmetric, the SNR, the $SNR_M$, and the INR may be applicable to the second pico base station. In Equation 1, $k_1$ denotes a parameter that is associated with a ratio of a transmission power between a pico base station and the macro base station.

Accordingly, an optimal rate may be expressed by Equation 2.

$$\max_{k_1} \min(R_1, R_2) \quad \text{[Equation 2]}$$

$$R_1 = \log\left(1 + \frac{k_1 SNR}{1 + k_1 INR}\right) + \log\left(1 + \frac{(1-k_1)SNR_M}{1 + k_1(SNR + INR)}\right)$$

$$R_2 = \log\left(1 + \frac{k_1 SNR}{1 + k_1 INR}\right) + \frac{1}{2}\log\left(1 + \frac{2(1-k_1)SNR_M}{1 + k_1(SNR + INR)}\right)$$

An algorithm for calculating the optimal rate, such as Equation 2, is as follows.

$$k_{pol} = \frac{SNR_M(1+INR) - SNR(1+SNR_M)}{SNR(SNR+INR-2SNR_M) - INR\,SNR_M(SNR+INR+1)}$$

$$R_2 = \log\left(1 + \frac{k_1 SNR}{1 + k_1 INR}\right) + \frac{1}{2}\log\left(1 + \frac{2(1-k_1)SNR_M}{1 + k_1(SNR + INR)}\right)$$

Step 1. $SNR - (INR+1)SNR_M \geq 0$?

Yes $\to k_1 = 1$, $R = \log\left(1 + \frac{SNR}{1+INR}\right)$

No $\to k_1 = k_{pol}$, $R = R_2|_{k_1 = k_{pol}}$

Based on the forgoing algorithm, a transmission power and a rate of each base station may be determined.

(2) An algorithm for optimal power allocation in the horizontal rate splitting scheme, that is, in the second mode, is as follows.

An achievable rate (R) of the horizontal rate splitting scheme is expressed by Equation 3. In this example, it is assumed that the first picocell and the second picocell are symmetric.

$$R = \log\left(1 + \frac{(1-k_2)SNR}{1 + (1-k_2)INR}\right) + \quad \text{[Equation 3]}$$

$$\min\left\{\frac{1}{2}\log\left(1 + \frac{k_2(SNR+INR)}{1 + (1-k_2)(SNR+INR)}\right),\right.$$

$$\min\left(\log\left(1 + \frac{k_2 INR}{1 + (1-k_2)(SNR+INR)}\right),\right.$$

$$\left.\left.\log\left(1 + \frac{k_2 SNR}{1 + (1-k_2)(SNR+INR)}\right)\right)\right\}$$

In this example, a method that defines a parameter is similar to the vertical rate splitting scheme.

According to various examples, a strong interference channel is not considered, and thus, the last term may be omitted. Therefore, the optimal rate may be expressed by Equation 4, in the same manner as the vertical rate splitting scheme.

$$\max_{k_2} \min(R_1, R_2) \quad \text{[Equation 4]}$$

$$R_1 = \log\left(1 + \frac{(1-k_2)SNR}{1 + (1-k_2)INR}\right) +$$

$$\log\left(1 + \frac{k_2 INR}{1 + (1-k_2)(SNR+INR)}\right)$$

$$R_2 = \log\left(1 + \frac{(1-k_2)SNR}{1 + (1-k_2)INR}\right) +$$

-continued $$\frac{1}{2}\log\left(1 + \frac{k_2(SNR+INR)}{1 + (1-k_2)(SNR+INR)}\right)$$

An algorithm for calculating the optimal rate, such as Equation 4, is as follows.

$$k_{pol} = \frac{INR - SNR + (SNR+INR)INR}{(SNR+INR)INR}$$

$$k_{cross} = \frac{SNR^2 + SNR - INR^2 INR}{SNR^2}$$

$$R_2 = \log\left(1 + \frac{(1-k_2)SNR}{(1-k_2)INR + 1}\right) + \frac{1}{2}\log\left(1 + \frac{k_2(SNR+INR)}{(1-k_2)(SNR+INR) + 1}\right)$$

Step 1. $SNR > INR^2 + INR$?

Yes $\to k_2 = 0$, $R = \log\left(\frac{1+SNR+INR}{1+INR}\right)$

No $\to$ Go to next step.

Step 2. $k_{pol} > k_{cross}$?

Yes $\to k_2 = k_{pol}$, $R = R_2|_{k_2 = k_{pol}}$

No $\to k_2 = k_{cross}$, $R = R_2|_{k_2 = k_{cross}}$

Based on the algorithm, a transmission power and a rate of each base station may be determined.

Herein, an example of a difference in performance between the optimal solution of the hierarchical rate splitting method and the sub-optimal solution is described.

Figure 6:
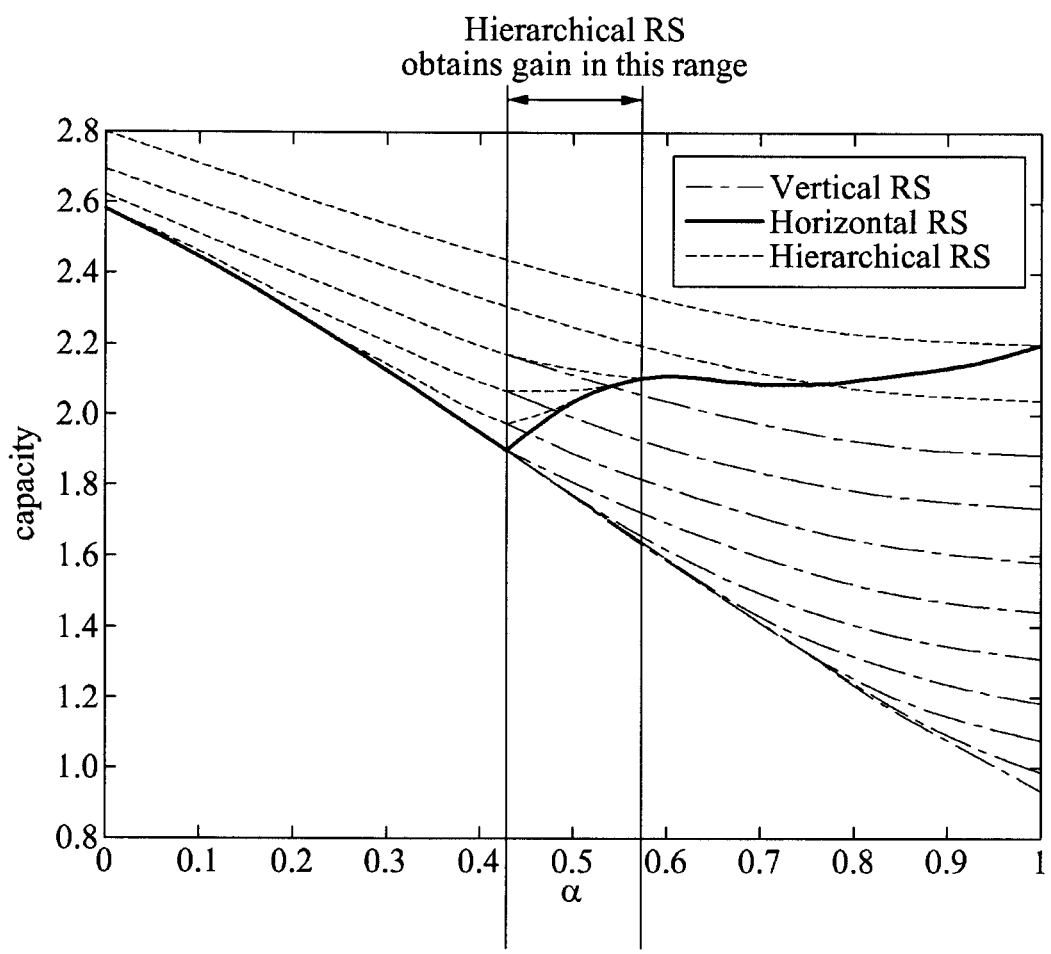
FIG. 6 is a graph that compares an optimal solution of a hierarchical rate splitting method to two sub-optimal solutions.

FIG. 6 is a graph that compares an optimal solution of a hierarchical rate splitting method to two sub-optimal solutions. In this example, the two sub-optimal solutions are a vertical rate splitting scheme and a horizontal rate splitting scheme.

Referring to FIG. 6, the graph shows a sum capacity based on the relationship $$\alpha = \frac{\log INR}{\log SNR}.$$

In this example, INR denotes an intensity of interference from a pico base station that affects a neighboring pico terminal, and SNR denotes an intensity of a signal from a pico base station that affects a serving terminal.

Referring to FIG. 6, if $\alpha$ is low, for example, $\alpha < 0.4$, a performance of the optimal solution of the hierarchical rate splitting method may almost be the equivalent of a performance of the vertical rate splitting scheme, and if $\alpha$ is high, for example, $\alpha > 0.6$, the performance of the optimal solution of the hierarchical rate splitting method may almost be the equivalent of the performance of the horizontal rate splitting scheme. As another example, if $\alpha$ is around 0.5, the hierarchical rate splitting method may have a marginal gain.

An optimal transmission power allocation of the hierarchical rate splitting method may perform optimization using a numerical tool. Meanwhile, the two sub-optimal solutions, that is, the vertical rate splitting scheme and the horizontal rate splitting scheme, may perform transmission power allocation based on the optimal power allocation algorithms described herein. Therefore, the sub-optimal solutions may be more practical.

Accordingly, if one of the vertical rate splitting scheme and the horizontal rate splitting scheme is selected based on a, performance may be approximately equivalent to the optimal solution of the hierarchical rate splitting method. For example, if α is greater than a predetermined threshold, that is, if INR is greater than the predetermined threshold, a hierarchical cell communication system may perform the horizontal rate splitting scheme, and if α is less than the predetermined threshold, that is, if the INR is less than the predetermined threshold, the hierarchical cell communication system may perform the vertical rate splitting.

Hierarchical Rate Splitting Method (Method 2—Third Mode)

Figure 7:
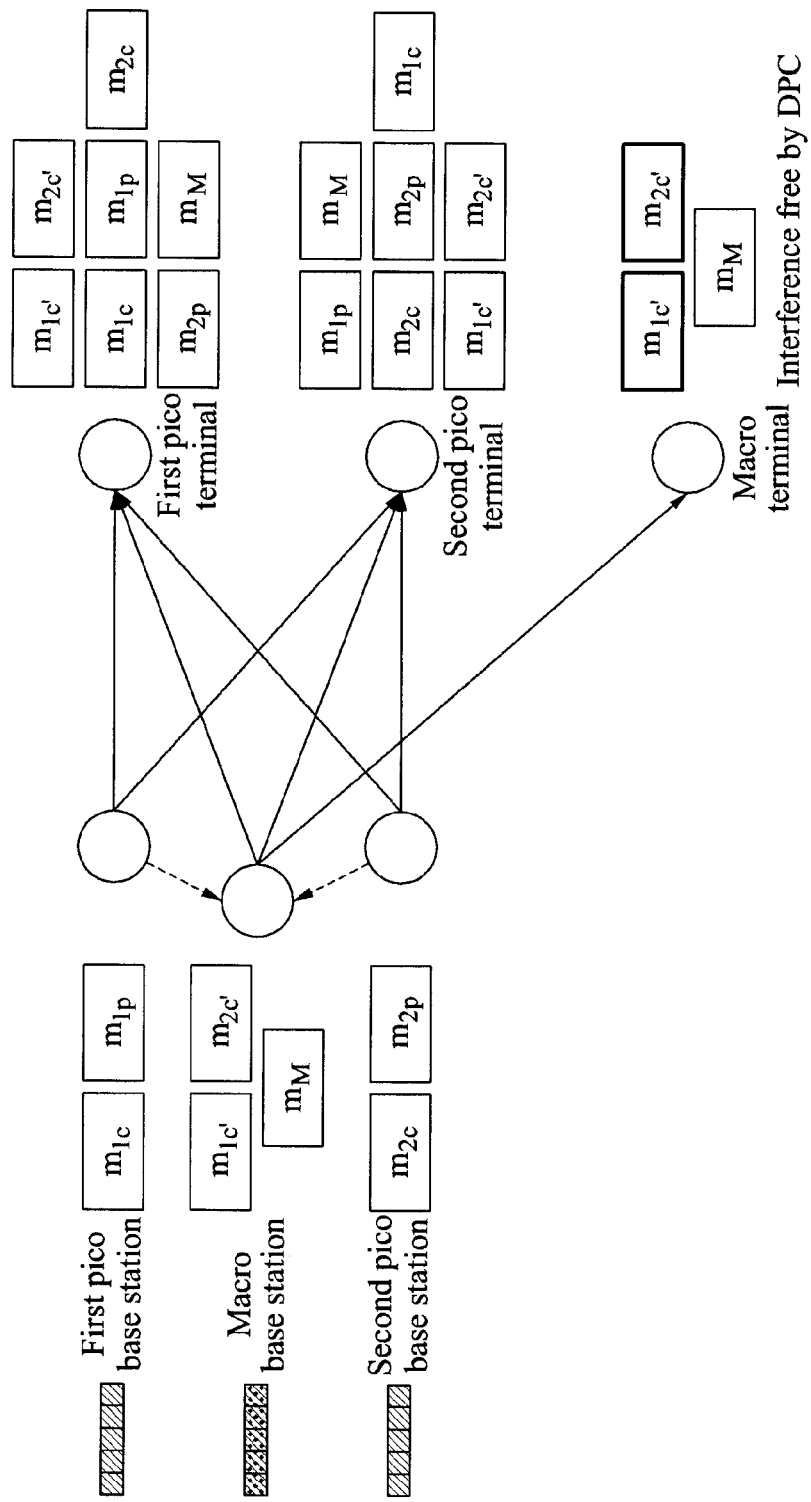
FIG. 7 is a diagram illustrating another example of a hierarchical rate splitting method.

FIG. 7 illustrates another example of a hierarchical rate splitting method.

Referring to FIG. 7, according to a second hierarchical rate splitting method, a macro base station simultaneously supports pico terminals and a macro terminal, in comparison to supporting only pico terminals in a predetermined frequency band (method 1) or performing silencing such as in DCS. In this example, the interference from a pico terminal that affects the macro terminal is significantly small and the interference is ignored. A mode that uses the hierarchical rate splitting method is referred to as a third mode.

Each of pico base stations such as a first pico base station and a second pico base station, may transmit a common message, for example, $m_{1c}$, $m_{2c}$, and a private message, for example, $m_{1p}$, $m_{2p}$, for a corresponding pico terminal, in the same manner as a basic rate splitting scheme. The macro base station may transmit $m_{1c'}$ and $m_{2c'}$ for the two pico terminals, and may transmit a private message ($m_M$) for the macro terminal.

In this example, $m_{1c'}$ and $m_{2c'}$ may act as interference in the macro terminal, and thus, the macro base station may perform dirty paper coding (DPC) to prevent $m_{1c'}$ and $m_{2c'}$ from acting as interference in the macro terminal. The macro base station may use real-time channel information between the macro base station and the macro terminal, to perform DPC. In this example, the real-time channel information is not interference channel information, and thus, DPC may be readily performed.

Standard for Selecting Hierarchical Rate Splitting Mode

Hierarchical rate splitting modes have been described according to various example. The hierarchical rate splitting method may be appropriately selected to for each situation. Examples of the standard for selecting the hierarchical rate splitting method are as follows.

(1) Selection Based on a Macro Channel Condition

If a channel condition of a channel between a macro base station and a macro terminal is bad, for example, if a channel condition value of the macro terminal<$\delta_1$, a hierarchical cell communication system may operate in the method 1, that is, the first mode or the second mode. If the channel condition of the macro terminal is good, for example, if the channel condition value of the macro terminal >$\delta_1$, the hierarchical cell communication system may operation in the method 2, that is, the third mode. In this example, $\delta_1$ is a predetermined threshold. The standard is based on an idea that allocating transmission power for pico terminals is more effective than using the method 2 that supports the macro terminal if the channel condition of the macro terminal is bad.

(2) Performance of a Macro Terminal and a Pico Terminal

If performance of pico terminals is worse than performance of the macro terminal, for example, if the performance of the pico terminals <$\delta_2$, the hierarchical cell communication system operates in the method 1, that is, the first mode or the second mode. If the performance of the pico terminals is better than the performance of the macro terminal, for example, if the performance of the pico terminals >$\delta_2$, the hierarchical cell communication system operates in the method 2, that is, the third mode. In this example, $\delta_1$ is a predetermined threshold. The standard is based on an idea that if the performance of the macro terminal is bad, the hierarchical cell communication system operates more effectively based on the method 2 that simultaneously supports the pico terminals and the macro terminal rather than operating based on the method 1 which is a rate splitting scheme performed only for the pico terminals.

Principle of Operations Based on a Cell Structure

The methods described in various examples may be applicable in various network environments. For example, the methods may be applicable to two network environments such as a vertical cell structure and a horizontal cell structure.

Figure 8:
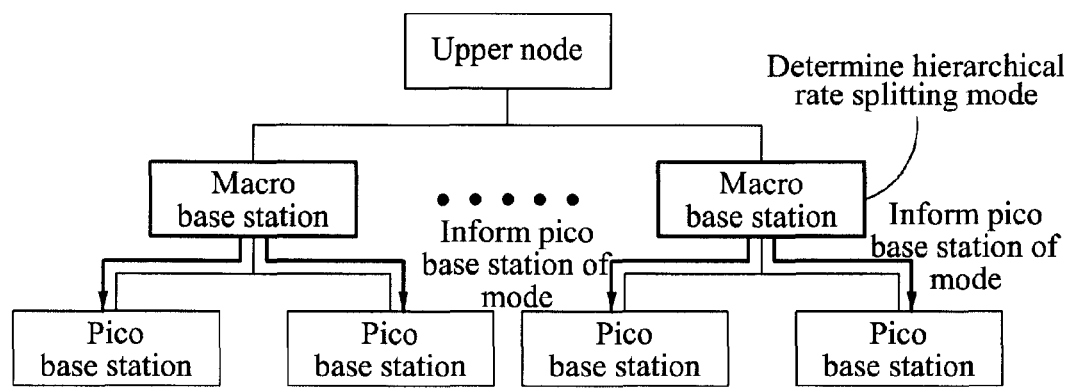
FIG. 8 is a diagram illustrating an example that applies a hierarchical rate splitting method in a vertical cell structure.

FIG. 8 illustrates an, example that applies a hierarchical rate splitting method in a vertical cell structure.

Referring to FIG. 8, a vertical cell structure has a structure in which a macro base station and a pico base station are connected hierarchically. In this example, data for pico terminals is transmitted to the pico base station via the macro base station. Accordingly, the macro base station may capture data for the pico terminals without additional overhead. Therefore, the macro base station may determine a hierarchical rate splitting mode and may inform the pico base stations of information that is associated with the hierarchical rate splitting mode such as the hierarchical rate splitting mode and adaptive modulation and coding (AMC) information with respect to a signal to be decoded by the pico terminal.

Figure 9:
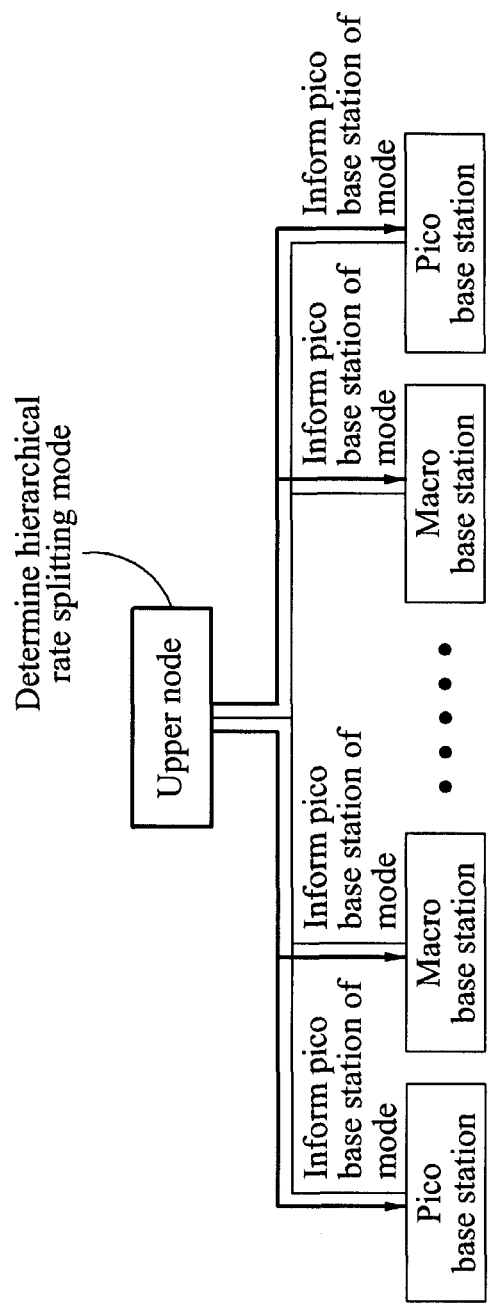
FIG. 9 is a diagram illustrating an example that applies a hierarchical rate splitting method in a horizontal cell structure.

FIG. 9 illustrates an example that applies a hierarchical rate splitting method in a horizontal cell structure.

Referring to FIG. 9, a horizontal cell structure has a structure in which a macro base station and a pico base station are directly connected to an upper node. In this example, the upper node may determine a hierarchical rate splitting mode, and may transmit, to the macro base station and the pico base station, information that is associated with the determined hierarchical rate splitting mode such as the hierarchical rate splitting mode and AMC information with respect to a signal to be decoded by each terminal. In this example, data for the pico terminals may be transmitted to the macro base station and thus, additional backhaul overhead may be generated.

Figure 10:
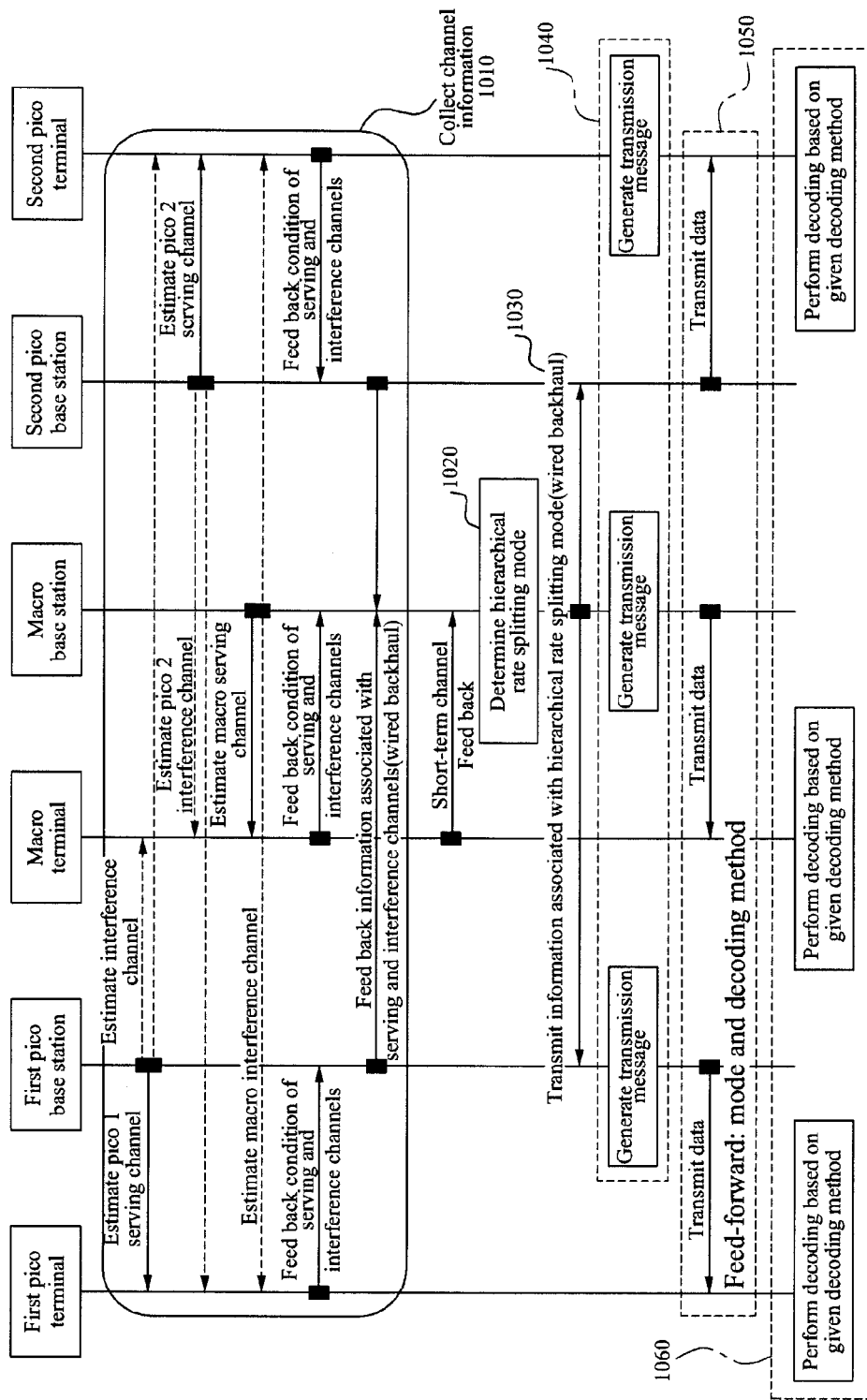
FIG. 10 is a flowchart illustrating an example of a hierarchical rate splitting process.

FIG. 10 illustrates an example of a hierarchical rate splitting process.

Referring to FIG. 10, an example of the hierarchical splitting method with respect to a vertical cell structure is described. In 1010, a macro cell and pico cells, such as, a first pico cell and a second pico cell, collect channel information. The procedure for collecting the channel information may include obtaining information that is associated with an average power of a channel based on a long-term period.

A macro base station determines a hierarchical rate splitting mode based on the standard of FIG. 7, in 1020. For example, the macro base station may determine a transmission power of each base station based on an optimal transmission power allocation algorithm.

The macro base station transmits, to pico base stations, information that is associated with the hierarchical rate splitting mode, in 1030. For example, the information that is associated with the hierarchical rate splitting mode may include the hierarchical rate splitting mode, ACM information with respect to signals received by terminals, and information that is associated with a rate splitting message set.

Each of the base stations, that is, the macro base station and the pico base stations, generates a corresponding hierarchical rate splitting message, in 1040.

The base stations transmit data, in 1050. For example, each of the base stations may perform feed forwarding of the hierarchical rate splitting mode and information that is associated with a decoding method to a corresponding terminal, so that the terminals perform decoding.

The terminals, such as the macro terminal and the pico terminals, perform decoding on the signals that are transmitted from the base stations, based on given decoding methods, in 1060.

Figure 11:
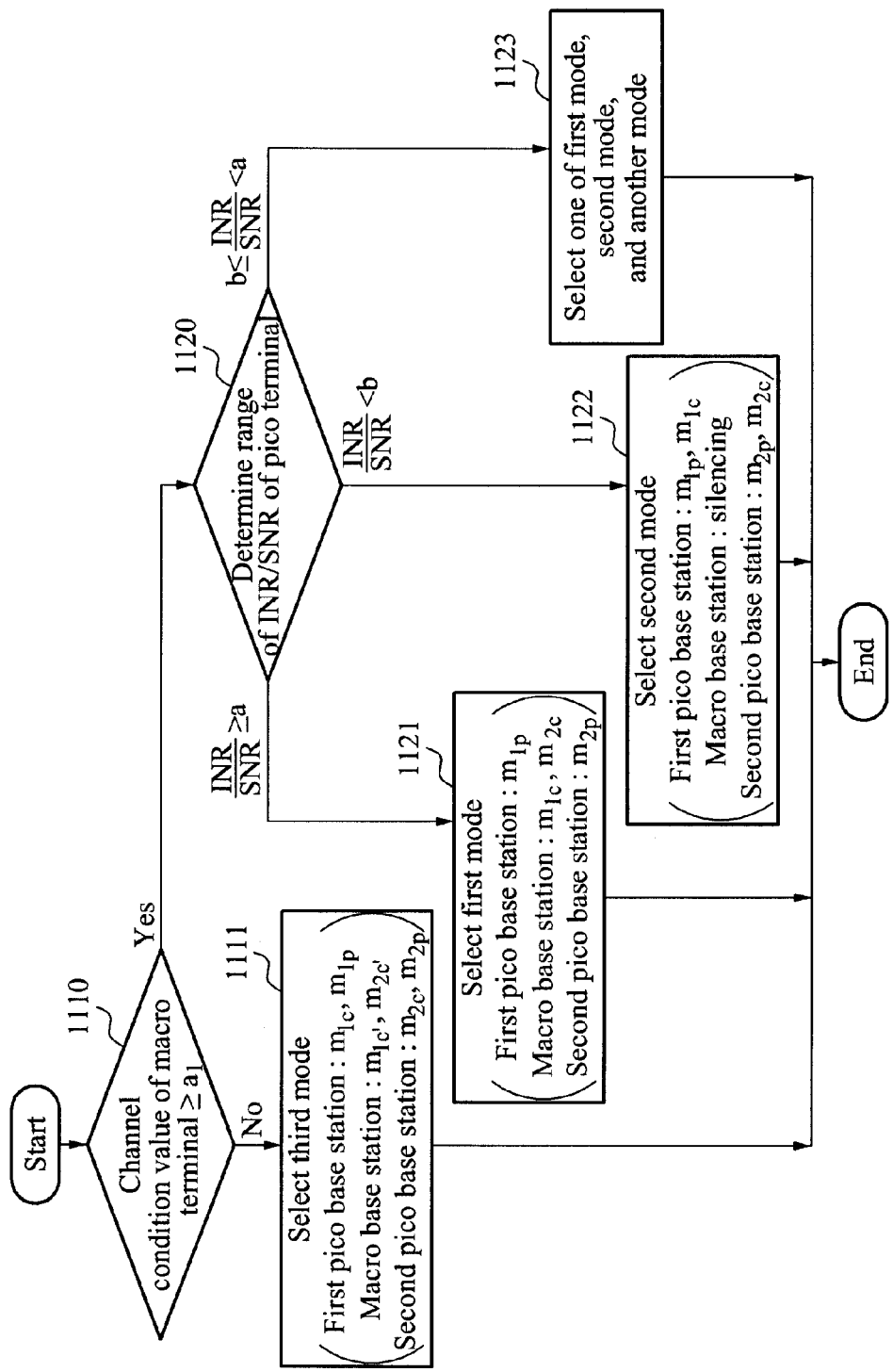
FIG. 11 is a flowchart illustrating an example of a hierarchical rate splitting mode determining method.

FIG. 11 illustrates an example of a hierarchical rate splitting mode determining method.

Referring to FIG. 11, the hierarchical rate splitting mode determining method determines whether a channel condition value of a macro terminal is greater than or equal to a predetermined threshold ($\delta_1$), in 1110.

If the channel condition value of the macro terminal is greater than or equal to $\delta_1$, that is, if a channel condition of the macro terminal is good, the hierarchical rate splitting mode determining method may select the third mode of FIG. 7.

If the channel condition value of the macro terminal is less than δ1, that is, if the channel condition of the macro terminal is bad, the hierarchical rate splitting mode determining method determines a range of INR/SNR of pico terminals, in 1120.

If the INR/SNR of the pico terminals is less than a predetermined value such as a, the hierarchical rate splitting mode determining method selects the first mode FIG. 4, in 1121.

If the INR/SNR of the pico terminals is greater than or equal to a predetermined value b, the hierarchical rate splitting mode determining method selects the second mode FIG. 4, in 1122.

If the INR/SNR is greater than or equal to the predetermined value b and less than the predetermined value a, the hierarchical splitting mode determining method selects one of the first mode, the second mode, and another mode, in 1123.

As described herein, the hierarchical rate splitting mode determining mode may determine a transmission power with respect to a corresponding frequency band. The base stations may perform encoding based on the determined hierarchical rate splitting mode and the transmission power, using a rate splitting scheme.

The hierarchical rate splitting mode determining method has been described in the forgoing. The examples described with reference to FIGS. 1 through 10 are applicable to the hierarchical rate splitting mode determining method, and thus, additional description thereof is omitted for conciseness.

Figure 12:
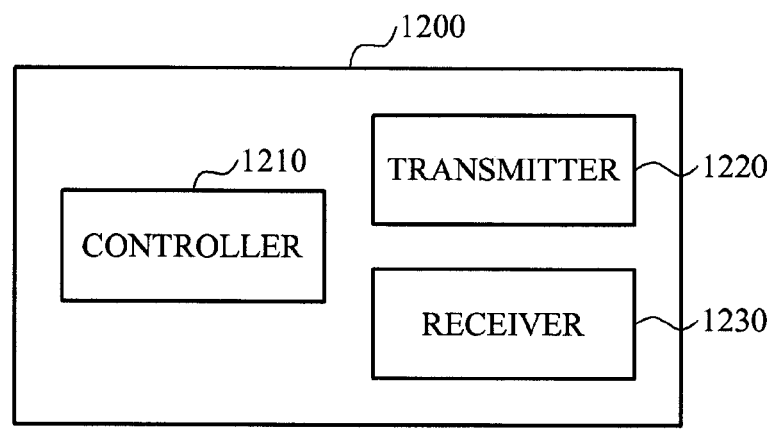
FIG. 12 is a diagram illustrating an example of a macro base station.

FIG. 12 illustrates an example of a macro base station.

Referring to FIG. 12, macro base station 1200 includes a controller 1210, a transmitter 1220, and a receiver 1230. The macro base station 1200 may remove or prevent interference in a hierarchical communication system.

The controller 1210 may determine a rate splitting transmission mode for a pico base station included in the hierarchical communication system. For example, the rate splitting transmission mode may be determined based on a channel condition between the macro base station and a macro terminal that is served by the macro base station. As another example, the rate splitting transmission mode may be determined based on the performance of the pico terminal in comparison to the performance of the macro terminal.

The transmitter 1220 may transmit the determined rate splitting transmission mode to the pico base station. The receiver 1230 may receive information about interference affecting the pico terminal.

In various example, the rate splitting transmission mode include a first hierarchical rate splitting mode in which the macro base station 1200 performs rate splitting to support a pico terminal corresponding to the pico base station, using a frequency band that the macro base station 1200 does not use to support the macro terminal, and a second hierarchical rate splitting mode in which the macro base station 1200 simultaneously supports the pico terminal corresponding to the pico base station and the macro terminal, using the same frequency band.

The first hierarchical rate splitting mode may include a vertical rate splitting scheme in which the pico base station transmits private messages to the pico terminal and the macro base station 1200 transmits common messages to the pico terminal, and a horizontal rate splitting scheme in which the macro base station 1200 is silent, and the pico base station transmits private messages and common messages to the pico base station. In this example, the private messages are only capable of being decoded by pico terminals served by the pico base station, and the common messages are capable of being decoded by other pico terminals served by another pico base station.

The controller 1210 may determine to use the vertical rate splitting scheme or the horizontal rate splitting scheme based on an interference to noise ratio (INR) and a signal to noise ratio (SNR) of the pico terminal. The examples described with reference to FIGS. 1-11 are also applicable to the macro base station 1200 that is described with reference to FIG. 12. A further description thereof is omitted here for conciseness.

Various examples herein describe a hierarchical rate splitting method that may adaptively determine a hierarchical rate splitting mode, based on a channel condition of a channel between a macro base station and a macro terminal, a performance of pico terminals compared to a performance of macro terminal, an SNR for each of the pico terminals, an INR for each of the pico terminals. And thus, interference may be effectively controlled and a transmission capacity may increase in a hierarchical cell communication system.

Various examples herein describe a hierarchical rate splitting method that may use a smaller amount of channel information when compared to another algorithm that is associated with inter-cell interference, and thus, overhead may be reduced.

Various examples herein describe a hierarchical rate splitting method that may provide a few hierarchical rate splitting modes that are adaptively applied based on a communication environment and thus, a sub-optimal solution that is almost equivalent to an optimal solution may be readily obtained.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a macro base station in a hierarchical cell communication system including the macro base station that serves a macro terminal, a first pico base station that serves a first pico terminal, and a second pico base station that serves a second pico terminal, the method comprising:
    determining a hierarchical transmission mode in a predetermined frequency band, from among a plurality of hierarchical transmission modes, based on a channel condition value of a channel between the macro base station and the macro terminal,
    wherein each hierarchical transmission mode identifies a type of message that is generated by each of the macro base station, the first pico base station, and the second pico base station, and
    wherein the hierarchical transmission mode identifies a type of message transmitted by the macro base station to the first and second pico terminals and the macro terminal, a type of message transmitted by the first pico base station to the first pico terminal, and a type of message transmitted by the second pico base station to the second pico terminal,
    wherein the hierarchical transmission mode comprises a first hierarchical transmission mode in which the macro base station supports a pico terminal corresponding to the pico base station, using a frequency band that the macro base station does not use to support the macro terminal and a second hierarchical transmission mode in which the macro base station simultaneously supports the pico terminal corresponding to the pico base station and the macro terminal, using the same frequency band; and
    determining a transmission power with respect to the predetermined frequency band, based on the hierarchical transmission mode.

2. The method of claim 1, further comprising:
    transmitting, to the first pico base station and the second pico base station, information that is associated with the determined hierarchical transmission mode.

3. The method of claim 1, wherein the determining of the hierarchical transmission mode comprises:
    determining a candidate mode as the hierarchical transmission mode,
    wherein the candidate mode comprises at least one of:
    a first transmission mode in which the macro base station generates a common message for the first pico terminal and a common message for the second pico terminal, the first pico base station generates a private message for the first pico terminal, and the second pico base station generates a private message for the second pico terminal;
    a second transmission mode in which the macro base station is silenced, the first pico base station generates a common message and the private message for the first pico terminal, and the second pico base station generates a common message and the private message for the second pico terminal; and
    a third transmission mode in which the macro base station generates the common message for the first pico terminal, the common message for the second pico terminal, and a message for the macro terminal, the first pico base station generates the common message and the private message for the first pico terminal, and the second pico base station generates the common message and the private message for the second pico terminal.

4. The method of claim 1, wherein, in response to the channel condition value of the channel between the macro base station and the macro terminal being less than a predetermined threshold, and in response to a ratio of an interference to noise ratio (INR) to a signal to noise ratio (SNR) for each of the first pico terminal and the second pico terminal being less than a predetermined value, the determining of the hierarchical transmission mode comprises:
    determining the hierarchical transmission mode, to enable the macro base station to generate a common message for the first pico terminal and a common message for the second pico terminal, to enable the first pico base station to generate a private message for the first pico terminal, and to enable the second pico base station to generate a private message for the second pico terminal.

5. The method of claim 4, wherein the determining of the transmission power comprises:
    determining the transmission power with respect to the predetermined frequency band, based on an SNR of the first pico terminal with respect to the first pico base station, an SNR of the first pico terminal with respect to the macro base station, and an INR of the first pico terminal with respect to the second pico terminal, and based on an SNR of the second pico terminal with respect to the second base station, an SNR of the second pico terminal with respect to the macro base station, and an INR of the second pico terminal with respect to the first pico terminal.

6. The method of claim 1, wherein, in response to the channel condition value of the channel between the macro base station and the macro terminal being less than a predetermined threshold, and in response to a ratio of an INR to an SNR for each of the first pico terminal and the second pico terminal being greater than or equal to a predetermined value, the determining of the hierarchical transmission mode comprises:
    determining the hierarchical transmission mode to enable the macro base station to be silenced, to enable the first pico base station to generate a common message and a private message for the first pico terminal, and to enable the second pico base station to generate a common message and a private message for the second pico terminal.

7. The method of claim 6, wherein the determining of the transmission power with respect to the predetermined frequency band comprises:
    determining the transmission power with respect to the predetermined frequency band, based on an SNR of the first pico terminal with respect to the first pico base station and an INR of the first pico terminal with respect to the second pico terminal, and based on an SNR of the second pico terminal with respect to the second pico base station, an INR of the second pico terminal with respect to the first pico terminal.

8. The method of claim 1, wherein, in response to the channel condition value of the channel between the macro base station and the macro terminal being greater than or equal to a predetermined threshold, the determining of the hierarchical transmission mode comprises:
    determining the hierarchical transmission mode to enable the macro base station to generate a common message for the first pico terminal, a common message for the second pico terminal, and a private message for the macro terminal, and to enable the first pico base station to generate a common message and a private message for the first pico terminal, and to enable the second pico base station to generate a common message and a private message for the second pico terminal.

9. The method of claim 8, further comprising:
    performing a dirty paper coding (DPC) to prevent the common message of the macro base station for the first pico terminal and the common message of the macro base station for the second pico terminal from acting as interference in the macro terminal, in response to the channel condition value of the channel between the macro base station and the macro terminal being greater than or equal to a predetermined threshold.

10. The method of claim 1, further comprising:
    performing encoding using a scheme that is based on the hierarchical transmission mode and the transmission power.

11. A communication method of an upper node in a hierarchical cell communication system, the upper node having lower nodes including a macro base station that serves a macro terminal, a first pico base station that serves a first terminal, and a second pico base station that serves a second pico terminal, the method comprising:
    determining a hierarchical transmission mode in a predetermined frequency band, from among a plurality of hierarchical transmission modes, based on a channel condition value of a channel between the macro base station and the macro terminal,
    wherein the hierarchical transmission mode identifies a type of message that is generated by each of the macro base station, the first pico base station, and the second pico base station, and
    wherein the hierarchical transmission mode identifies a type of message transmitted by the macro base station to the first and second pico terminals and the macro terminal, a type of message transmitted by the first pico base station to the first pico terminal, and a type of message transmitted by the second pico base station to the second pico terminal,
    wherein the hierarchical transmission mode comprises a first hierarchical transmission mode in which the macro base station supports a pico terminal corresponding to the pico base station, using a frequency band that the macro base station does not use to support the macro terminal and a second hierarchical transmission mode in which the macro base station simultaneously supports the pico terminal corresponding to the pico base station and the macro terminal, using the same frequency band; and
    determining a transmission power for each of the macro base station, the first pico base station, and the second pico base station, with respect to the predetermined frequency band, based on the hierarchical transmission mode.

12. The method of claim 11, further comprising:
    transmitting information that is associated with the determined hierarchical transmission mode to each of the macro base station, the first pico base station, and the second base station.

13. The method of claim 11, wherein, in response to the channel condition value of the channel between the macro base station and the macro terminal being less than a predetermined threshold, and in response to a ratio of an interference to noise ratio (INR) to a signal to noise ratio (SNR) for each of the first pico terminal and the second pico terminal being less than a predetermined value, the determining of the hierarchical transmission mode comprises:
    determining the hierarchical transmission mode, to enable the macro base station to generate a common message for the first pico terminal and a common message for the second pico terminal, to enable the first pico base station to generate a private message for the first pico terminal, and to enable the second pico base station to generate a private message for the second pico terminal.

14. The method of claim 11, wherein, in response to the channel condition value of the channel between the macro base station and the macro terminal being less than a predetermined threshold, and in response to a ratio of an INR to an SNR for each of the first pico terminal and the second pico terminal being greater than or equal to a predetermined value, the determining of the hierarchical transmission mode comprises:
    determining the hierarchical transmission mode to enable the macro base station to perform silencing, to enable the first pico base station to generate a common message and a private message for the first pico terminal, and to enable the second pico base station to generate a common message and a private message for the second pico terminal.

15. The method of claim 11, wherein, in response to the channel condition value of the channel between the macro base station and the macro terminal being greater than or equal to a predetermined threshold, the determining of the hierarchical transmission mode comprises:

determining the hierarchical transmission mode to enable the macro base station to generate a common message for the first pico terminal, a common message for the second pico terminal, and a private message for the macro terminal, and to enable the first pico base station to generate a common message and a private message for the first pico terminal, and to enable the second pico base station to generate a common message and a private message for the second pico terminal.

16. A communication method of a macro base station in a hierarchical cell communication system that comprises the macro base station that serves a macro terminal, a first pico base station that serves a first pico terminal, and a second pico base station that serves a second pico terminal, the method comprising:

determining a hierarchical transmission mode in a frequency band in which transmission of a message for the macro terminal is not performed, from among a plurality of hierarchical transmission modes, based on a signal to noise ratio (SNR) and an interference to noise ratio (INR) for each of the first pico terminal and the second pico terminal, wherein the hierarchical transmission mode identifies a type of message that is generated by the macro base station, the first pico base station, and the second pico base station, and wherein the hierarchical transmission mode identifies a type of message transmitted by the macro base station to the first and second pico terminals and the macro terminal, a type of message transmitted by the first pico base station to the first pico terminal, and a type of message transmitted by the second pico base station to the second pico terminal, wherein the hierarchical transmission mode comprises a first hierarchical transmission mode in which the macro base station supports a pico terminal corresponding to the pico base station, using a frequency band that the macro base station does not use to support the macro terminal and a second hierarchical transmission mode in which the macro base station simultaneously supports the pico terminal corresponding to the pico base station and the macro terminal, using the same frequency band; and determining a transmission power with respect to the predetermined frequency band based on the hierarchical transmission mode.

17. The method of claim 16, wherein, in response to a ratio of the INR to the SNR for each of the first pico terminal and the second pico terminal being less than a predetermined value, the determining of the hierarchical transmission mode comprises:

determining the hierarchical transmission mode to enable the macro base station to generate a common message for the first pico terminal and a common message for the second pico terminal.

18. The method of claim 17, further comprising:

transmitting, to the first pico base station and the second pico base station, information that is associated with the hierarchical transmission mode, to enable the first pico base station to generate a private message for the first pico terminal and to enable the second pico base station to generate a private message for the second pico terminal, in response to a ratio of the INR to the SNR for each of the first pico terminal and the second pico terminal being less than a predetermined value.

19. The method of claim 16, wherein, in response to a ratio of the INR to the SNR for each of the first pico terminal and the second pico terminal being greater than or equal to a predetermined value, the determining of the hierarchical transmission mode comprises:

determining the hierarchical transmission mode to enable the macro base station to be silenced in the frequency band in which transmission of the message for the macro terminal is not performed.

20. The method of claim 19, further comprising:

transmitting, to the first pico base station and the second pico base station, information that is associated with the hierarchical transmission mode, to enable the first pico base station to generate a common message and a private message for the first pico terminal, and to enable the second pico base station to generate a common message and a private message for the second pico terminal, in response to a ratio of the INR to the SNR for each of the first pico terminal and the second pico terminal being greater than or equal to a predetermined value.

21. A macro base station in a hierarchical cell communication system, the macro base station comprising:

a controller configured to determine a hierarchical transmission mode for a pico base station included in the hierarchical communication system, from among a plurality of hierarchical transmission modes, based on a channel condition between the macro base station and a macro terminal that is served by the macro base station, wherein the hierarchical transmission mode identifies a type of message that is generated by the macro base station, the first pico base station, and the second pico base station, and wherein the hierarchical transmission mode identifies a type of message transmitted by the macro base station to the first and second pico terminals and the macro terminal, a type of message transmitted by the first pico base station to the first pico terminal, and a type of message transmitted by the second pico base station to the second pico terminal, wherein the hierarchical transmission mode comprises a first hierarchical transmission mode in which the macro base station supports a pico terminal corresponding to the pico base station, using a frequency band that the macro base station does not use to support the macro terminal and a second hierarchical transmission mode in which the macro base station simultaneously supports the pico terminal corresponding to the pico base station and the macro terminal, using the same frequency band; and a transmitter configured to transmit the determined hierarchical transmission mode to the pico base station.

22. The base station of claim 21, wherein the first hierarchical transmission mode comprises:

a vertical transmission scheme in which the pico base station transmits private messages to the pico terminal and the macro base station transmits common messages to the pico terminal; and a horizontal transmission scheme in which the macro base station is silent, and the pico base station transmits private messages and common messages to the pico base station, wherein private messages are only capable of being decoded by pico terminals served by the pico base station, and the common messages are capable of being decoded by other pico terminals served by another pico base station.

23. The base station of claim 21, wherein the controller determines to use the vertical transmission scheme or the horizontal transmission scheme based on an interference to noise ratio (INR) and a signal to noise ratio (SNR) of the pico terminal.

24. The base station of claim 21, further comprising a receiver configured to receive information about interference affecting the pico terminal.

25. The base station of claim 21, wherein each respective hierarchical transmission mode comprises a different grouping of stations among the macro base station, the first pico base station, and the second pico base station, for transmitting at least one of a private message and a common message to the first pico terminal and the second pico terminal.

26. The method of claim 1, wherein the hierarchical transmission mode comprises:
- a transmission mode in which the macro base station generates a common message for the first pico terminal, the common message for the second pico terminal, and a message for the macro terminal, the first pico base station generates the common message and a private message for the first pico terminal, and the second pico base station generates the common message and the private message for the second pico terminal.

\* \* \* \* \*